May 1, 1962 E. E. PENNUCCI 3,032,614

BINAURAL SOUND PHONOGRAPH REPRODUCER AND ADAPTER

Filed July 15, 1959 2 Sheets-Sheet 1

INVENTOR.
ENRICO E. PENNUCCI
BY Zolton G. Polachek
ATTORNEY

May 1, 1962 E. E. PENNUCCI 3,032,614

BINAURAL SOUND PHONOGRAPH REPRODUCER AND ADAPTER

Filed July 15, 1959 2 Sheets-Sheet 2

INVENTOR.
ENRICO E. PENNUCCI
BY Zoltan H. Polachek
ATTORNEY

United States Patent Office 3,032,614

Patented May 1, 1962

3,032,614
BINAURAL SOUND PHONOGRAPH REPRODUCER AND ADAPTER

Enrico E. Pennucci, 1470 Washington Ave., Bronx, N.Y.
Filed July 15, 1959, Ser. No. 827,202
2 Claims. (Cl. 179—100.41)

This invention relates to the art of phonograph pickups and is particularly directed at a pickup adapted for use as an auxiliary to a main conventional monoaural pickup to provide binaural sound reproductions from phonograph records.

According to the invention there is provided a pickup device which can be attached to a conventional tone arm of a phonograph without the use of tools. The pickup device includes a pivotally supported and spring-pressed tone box adapted to carry a needle or stylus which is intended to engage in a groove of a phonograph disk record. The pickup device can be used as a monoaural pickup but is especially adapted for binaural sound reproduction when mounted on a tone arm carrying a monoaural pickup.

It is therefore a principal object of the invention to provide a removable clip-on type of pickup for a phonograph.

It is a further object to provide a clip-on type of pickup with a spring-pressed tone box and stylus.

It is a further object to provide a clip-on type of pickup provided with a pair of bars adjustably positionable and pivotable with respect to a tone arm, with a pivotable bracket adjustably carrying one or more tone boxes and styli thereon.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 2, 3:
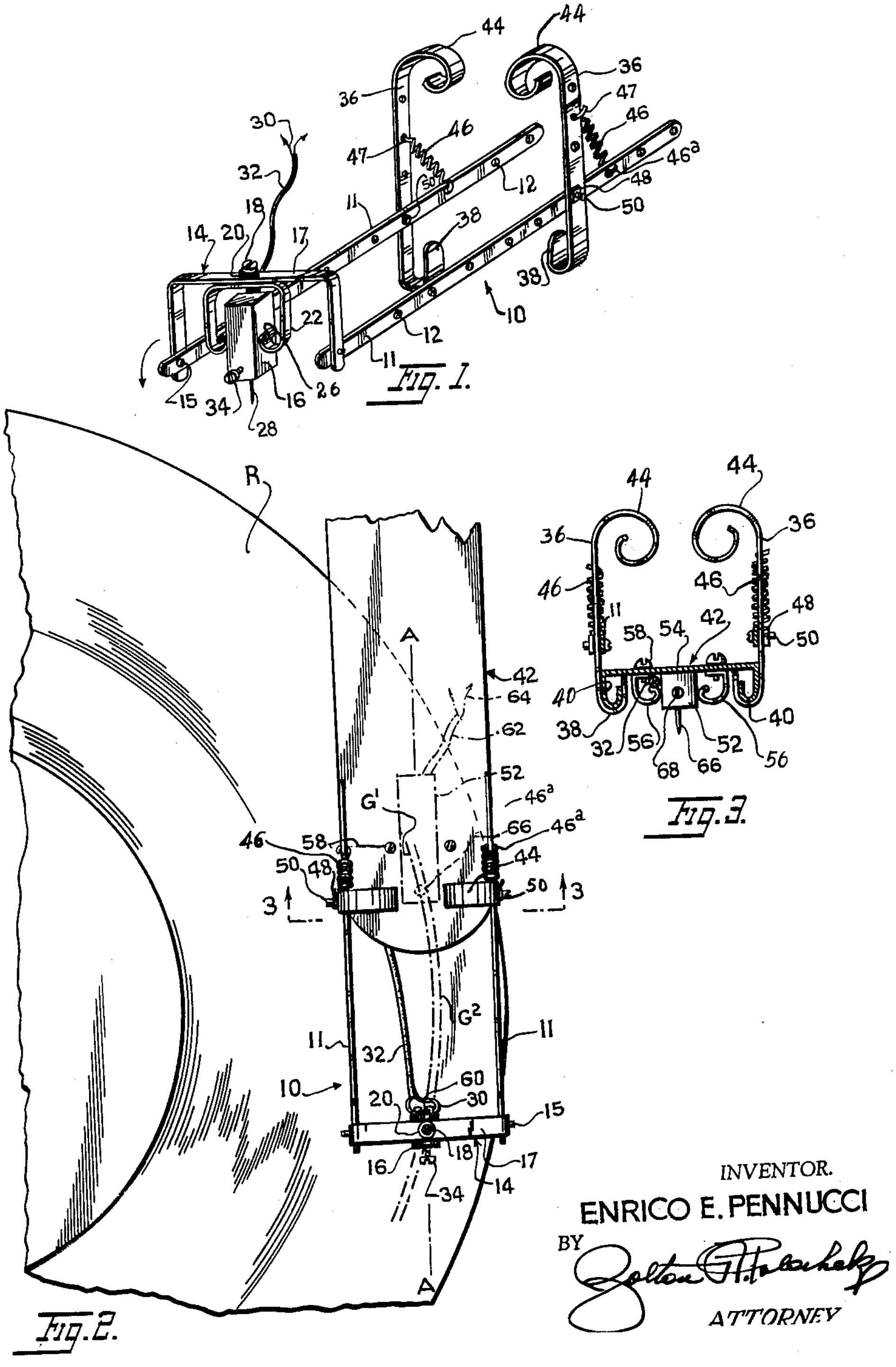
FIG. 1 is a perspective view of a pickup device embodying one form of the invention.
FIG. 2 is a fragmentary top plan view of a phonograph record with a tone arm in operative position thereon, and with the pickup device of FIG. 1 applied thereto.
FIG. 3 is a transverse sectional view taken on the plane of the line 3—3 of FIG. 2, parts being omitted.

Referring to FIGS. 1 and 2 of the drawings, there is shown a pickup device 10 having a pair of elongated straight, flat bars 11 with a plurality of longitudinally spaced holes 12. Near one end of each bar there is secured the free end of an inverted rectangular U-shaped bracket 14. Screws 15 secure the bracket to the bars. A screw 18 supports an inverted U-shaped leaf spring support 22 on the center of the bight 17 of the bracket. A washer 20 is disposed between the head of the screw and the bight of the bracket. The leaf spring support 22 retains a tone box 16 at the underside of the bight 17 of bracket 14. The spring support 22 has depending inwardly curled ends 26 which frictionally engage the sides of the tone box and permit the tone box to be adjustably positioned longitudinally of the pickup device. The tone box comprises a generally rectangular housing containing a crystal, electromagnetic, ceramic, or other type transducer for transforming the mechanical vibrations picked up by stylus 28 into electrical oscillations which are transmitted via wires 30 in cable 32 to a suitable amplifier of a sound system.

The stylus 28 is removably secured in the bottom of the tone box by a screw 34. Bars 11 are pivotally mounted on upright flat arms 36. These arms have lower upturned portions 38 forming springy hooks which can be clipped on the inner channeled depending sides 40 of a tone arm 42 as best shown in FIG. 3. The end of the pickup device extends beyond the end of the tone arm so that the stylus 28 of the tone box 16 can contact the record R. The upper ends of arms 36 are turned inwardly to form handle portions 44 which are used in lifting the tone arm and pickup off a disk record R and in positioning the pickup thereon.

Two coil springs 46, secured between holes 47 in arms 36 and holes 12 in bars 11, are provided for loading the tone box 16 with respect to bars 11 and tone arm 42 so that the pressure of the stylus 28 on a disk record can be regulated by selectively positioning the ends 46ᵃ of springs 46 in desired holes 12 of bars 11. The arms 36 are pivotally mounted on the bars by means of bolts 50 and washers 48.

Tone arm 42, as shown in FIGS. 2 and 3, may have a conventional monoaural transducer enclosed in a tone box 52. This tone box held removably under the plate-like body 54 of the tone arm by coiled leaf springs 56 secured to the plate-like body by screws 58. Cable 32 of pickup 10 extends from tone box 16 past one box 52 through a passage defined by one of the springs 56. The wires 30 are attached to tone box 16 by screws 60. Cable 62 of tone box 52 extends rearwardly from this box and its wires 64 shown in dotted lines in FIG. 2 terminate at another amplifier (not shown) in the sound system.

Tone box 52 carries stylus 66 which is held removably in the tone box by screw 68. The stylus of each tone box is centered so that they are disposed in a common vertical plane A—A as indicated in FIG. 2, respectively projecting into different adjacent spiral grooves $G_1$ and $G_2$ of a disk record R as indicated by dotted lines in FIG. 2. If the respective grooves are those of a binaural recording in which each groove carries different binaurally recorded audio signals, then each stylus will convey to its transducer the vibrations from its own groove. The tone arm is thus provided with the one main monoaural tone box 52 and the auxiliary or supplementary tone box 16.

If it is desired to use the pickup 10 monoaurally, upon a monoaurally recorded record, stylus 66 can be removed and only stylus 28 of tone box 16 will track in the record groove. A particular advantage of the present invention, is that the pickup 10 can easily be clipped on to the tone arm 42 whenever it is desired to convert the tone arm from monoaural to binaural sound reproduction. Of course, if stylus 28 is removed then the tone arm will provide monoaural recording via tone box 52 and its stylus 66.

It is preferred that arms 36 be formed of flat springy metal material. The bars 11 and bracket 14 should be made of very light metal or plastic material.

Bracket 14 is pivotally mounted on bars 11 so that the tone box can be angularly adjusted on a horizontal axis defined by screws 15. Screw 18 makes it possible to adjust the disposition of the spring support 22 and tone box 16 on a vertical axis. Normally the tone arm 42 will have its own mechanical system (not shown) for adjusting the pressure of stylus 66 in groove $G_1$. Springs 46 provide a resilient loading means for the tone box 16 and stylus 28 and regulate the pressure of the stylus 28 in its groove $G_2$. The springs 46 also prevent the bars 11 from pivoting on bolts 50 thereby preventing stylus 28 from losing contact with the record while stylus 66 remains in contact with the record.

Figure 4:
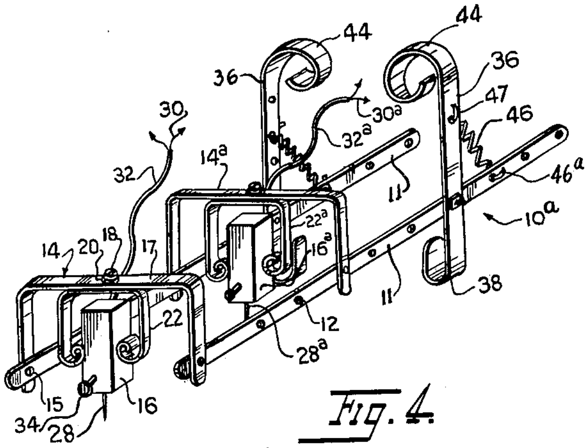
FIG. 4 is a view similar to FIG. 1 showing a pickup device embodying a modified form of the invention.

In FIG. 4 the modified form of pickup device 10$^a$ is shown provided with two brackets 14 and 14$^a$ so that two tone boxes 16 and 16$^a$ are supported by spring supports 22 and 22$^a$, respectively. A separate cable 32$^a$ has its lead wires 30$^a$ connected to terminals of tone box 16$^a$. The tone box carries a stylus 28$^a$ similar to stylus 28 in tone box 16.

Figures 5, 6:
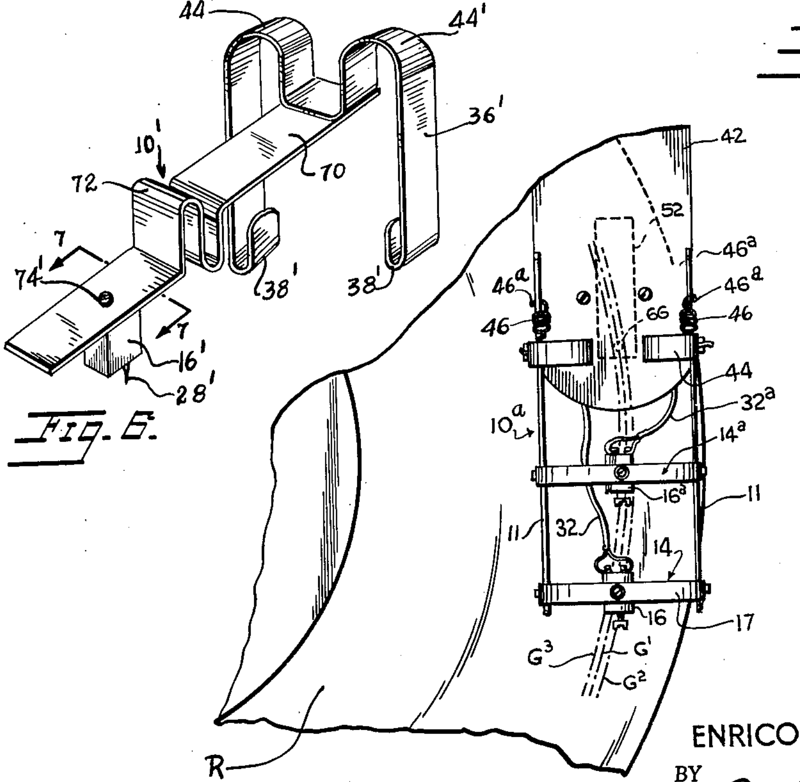
FIG. 5 is a view similar to FIG. 2 showing the modified form of pickup of FIG. 4 applied to the tone arm.
FIG. 6 is a perspective view of another modified form of pickup device.

In FIG. 5 there is shown how the several adjacent grooves $G_1$, $G_2$ and $G_3$ of record R are tracked by styli 66, 28 and 28$^a$, respectively. The cable 32$^a$ is disposed under the tone arm and can pass through a passage defined by one of springs 56 shown in FIG. 3, to terminate at a suitable amplifier. Use of two styli in the pickup device as described makes it possible to derive echo effects from the record. It also makes it possible to obtain stereophonic effects if the several tracks each carries one channel of several stereophonically recorded channels. More than two auxiliary styli can be provided by providing additional brackets and tone boxes on brackets on the arms 11 of the pickup device. The additional styli will track in further grooves of the record R.

It is possible to adjust the time delay of reproduction of the several recorded channels by adjustably positioning the brackets 14, 14$^a$ on arms 11 by shifting the positions of the brackets in holes 12. This adjustment will be rather coarse since it can be made only in discrete steps determined by the spacing of the holes 12. Further fine time delay adjustment can be made by moving the styli 28, 28$^a$ forwardly or rearwardly in the spring supports 22, 22$^a$.

Figure 7:
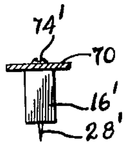
FIG. 7 is a cross-sectional view taken on the plane of the line 7—7 of FIG. 6.

Referring now to the modification of the invention shown in FIGS. 6 and 7, the pickup device 10' shown herein includes a pair of opposed depending arms 36' formed of bar material. The arms are formed with hooked bottom ends 38' and with turned-over top ends 44'. The body of the pickup device comprises an elongated resilient bar 70 secured at one end to the extremities of the turned-over top ends 44'. Intermediate its ends, the bar 70 is bent upon itself to form a compound loop as indicated at 72, and outwardly of the loop 72 a tone box 16' depends from the arm and is removably secured thereto by a screw 74'. A stylus 28' is carried by the tone box. The resilient bar with bent loop therein affords a resilient mounting for the tone box whereby the pressure on the stylus is adjusted. The arms 36' are detachably mounted on the channeled flanges 40 of the tone arm 42 by hooking the bottom ends 38' thereover.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A clip-on pickup assembly for use with a phonograph tone arm having a pair of lateral depending sides, said pickup assembly comprising a pair of straight flat bars, an inverted U-shaped bracket secured at its ends to one end of the bars, a tone box suspended from the bight of the bracket, each of said bars having longitudinally spaced holes, a pair of flat arms having longitudinally spaced holes pivotally secured to the bars respectively, coil springs each having opposite ends engaged in a hole in one of the arms and in a hole in one of the bars, said flat arms having lower upwardly turned ends providing flexible clips for removably mounting the pickup assembly on a tone arm, said arms further having upper coiled ends extending toward each other to provide handle means, and means for removably retaining a stylus in a downwardly projecting position from said tone box.

2. A phonograph pickup assembly, comprising a pair of horizontally disposed straight flat bars in spaced relationship, an inverted U-shaped bracket with its legs secured to one end of the bars, a pair of upright bars pivotally mounted on the horizontally disposed bars intermediate the ends of said latter bars, each of said upright bars having a portion above the respective horizontal bar and a portion below said bar, a flexible upturned clip on the bottom end of each upright bar, the other end of each upright bar terminating in a coil, said coiled ends serving as handles, coil springs interposed between the portions of the upright bars above the horizontal bars and said horizontal bars for urging the clips on the bottom ends of the upright bars upwardly against a supported tone arm, an inverted U-shaped spring support secured to the bight portion of the bracket, the bottom free ends of the legs of the spring support being coiled, a tone box with stylus supported between the coils of the spring support and flexible conductors connecting the tone box to an amplifier of a sound system.

References Cited in the file of this patent

UNITED STATES PATENTS

| | | |
|---|---|---|
| 1,468,455 | Bristol | Sept. 18, 1923 |
| 2,033,648 | Ranger | Mar. 10, 1936 |
| 2,821,578 | Morrell | Jan. 28, 1958 |

FOREIGN PATENTS

| | | |
|---|---|---|
| 174,705 | Switzerland | Apr. 16, 1935 |